3,211,591
BASIC WELDING POWDERS
Gustav Miltschitzky and Walter Schindelin, Burghausen, Upper Bavaria, Germany, assignors to Wacker-Chemie G.m.b.H., Munich, Germany, a corporation of Germany
No Drawing. Filed Oct. 30, 1961, Ser. No. 148,699
Claims priority, application Germany, Sept. 26, 1958, W 24,165
8 Claims. (Cl. 148—26)

This application is a continuation-in-part of our application Serial No. 839,996, filed September 15, 1959, now abandoned, for Basic Welding Powders.

This invention relates to basic welding powders and it has for its object to provide novel and improved powders of this type.

Another object of the invention is to increase the tensile strength, impact resistance and bending resistance of seams which are welded with welding powders.

Still another object is to provide welding powders for welding unalloyed as well as alloy steel, in which the known prior art ingredients of conventional welding powders are proportioned and mixed in a novel manner which materially increases the effectiveness of the weld.

Other objects and advantages will be apparent as the nature of the invention is more fully disclosed.

The requirements for the mechanical strength values of welded seams are steadily increasing. Besides good tensile strength, the values for impact resistance should approximate those of the basic material as closely as possible. Hence up to now it has been considered a deficiency when the impact and bending resistance of seams welded with welding powders did not satisfy higher requirements.

The reason for the unsatisfactory welding results to date might be ascribed to the fact that the significance of the mole proportions of the individual components of the welding powders, in their relationship to each other, has so far not been recognized.

We have discovered a way of making basic welding powders which can be used for welding unalloyed as well as alloy steel, where the already known components of usual welding powders are added in such a way that the basic proportion is 1.1–2.2 and the mole proportions are: $MnO:SiO_2=1.0-2.2$, preferably 1.15–1.7, $$Al_2O_3:TiO_2=1.5-3.5$$

preferably 2.0–3.0, $CaO:MgO=1.2-1.8$, preferably, 1.2–1.6, whereupon the mixture is subsequently melted down, sintered and agglomerated. The basicity proportion is understood to be the mole proportion $$(CaO+MgO+\text{alkaline oxide}):SiO_2$$

The basic substances usually forming welding powders are silicic acid, alumina, titanium oxide, calcuim oxide, magnesium oxide, manganese oxides, fluorspar and alkaline oxides. Besides these components, such elements, alloys, compounds (for instance oxides, silicides, carbides, nitrides, borides) and mixtures of these substances can be added to the welding powder, which are contained in the material to be welded or which are to be alloyed into the work material. The addition of such substances serves to preserve the composition of the work materials used, or it is useful for their improvement. From the great number of substances that can be used, the following are mentioned by way of example: copper, boron, zirconium, vanadium, niobium, tantalum, chromium, molybdenum, tungsten, uranium, cobalt, nickel, carbon and rare earths. By adding these substances a refinement of the texture can be achieved for instance, also increased corrosion resistance and an improvement of the mechanical characteristics of the weld.

The substances can be mixed and subsequently processed by melting, sintering or agglomeration and granulated afterwards. But it is also possible to mix the elements, compounds or alloys in powder form separately or mixed together—with the welding material that has been pre-melted, pre-sintered or agglomerated and crushed again, and to subject it to a process of sintering once more. If the substances which might be necessary for the agglomeration are not contained in sufficient quantity in the original mixture, they can be added later. If necessary, this can be done in an inert or reducing atmosphere, whichever may be required.

The welding powder obtained can be used for the under-powder process, for the electric slag welding process and also for the inlay process.

The following examples give compositions which were melted and tested for their welding characteristics, these being given both with and without the addition of the steel-refining component which is contained in the work material to be welded. In Example 1 said component is NiO, in Example 2, $V_2O_5$, in Example 3, $Cr_2O_3$. In Examples 4, 5 and 6 it is a welding powder containing Mo, W and Zr, respectively. All figures are in weight percent.

EXAMPLE 1

|  | Without Nickel Oxide, percent | With Nickel Oxide, percent |
|---|---|---|
| $SiO_2$ | 21.60 | 21.23 |
| $Al_2O_3$ | 10.20 | 10.03 |
| $TiO_2$ | 4.00 | 3.94 |
| $MnO$ | 30.70 | 30.20 |
| $CaO$ | 16.00 | 15.75 |
| $MgO$ | 7.70 | 7.55 |
| $CaF_2$ | 9.80 | 9.65 |
| $NiO$ |  | 1.65 |

These two welding powders have a basicity ratio of 1.33; the mole ratios are $MnO:SiO_2=1.2$;

$$Al_2O_3:TiO_2=2.0;\ CaO:MgO=1.5$$

EXAMPLE 2

|  | Without Vanadium Oxide, percent | With Vanadium Oxide, percent |
|---|---|---|
| $SiO_2$ | 18.7 | 18.7 |
| $Al_2O_3$ | 15.3 | 15.3 |
| $TiO_2$ | 3.9 | 3.9 |
| $MnO$ | 28.7 | 28.7 |
| $CaO$ | 14.9 | 14.9 |
| $MgO$ | 7.5 | 7.5 |
| $CaF_2$ | 11.0 | 10.5 |
| $V_2O_5$ |  | 0.5 |

The basicity ratio=1.45; the mole ratios are $MnO:SiO_2=1.3;\ Al_2O_3:TiO_2=3.0;\ CaO:MgO=1.43$.

EXAMPLE 3

|  | Without Chromium Oxide, percent | With Chromium Oxide, percent |
|---|---|---|
| $SiO_2$ | 14.83 | 14.17 |
| $Al_2O_3$ | 23.16 | 22.05 |
| $TiO_2$ | 7.89 | 7.53 |
| $MnO$ | 21.77 | 20.75 |
| $CaO$ | 13.47 | 12.85 |
| $MgO$ | 7.25 | 6.92 |
| $CaF_2$ | 10.43 | 10.01 |
| $K_2O$ | 1.20 | 1.13 |
| $Cr_2O_3$ |  | 4.59 |

The basicity ratio=1.75; the mole ratios are

MnO:SiO$_2$=1.24; Al$_2$O$_3$:TiO$_2$=2.3; CaO:MgO=1.75.

EXAMPLE 4

*Welding powder containing molybdeum*

| | Percent |
|---|---|
| SiO$_2$ | 14.20 |
| Al$_2$O$_3$ | 23.10 |
| TiO$_2$ | 8.65 |
| MnO | 19.40 |
| CaO | 9.10 |
| MgO | 4.85 |
| K$_2$O | 2.20 |
| MoO$_3$ | 1.40 |
| CaF$_2$ | 17.10 |

The basicity ratio=1.27; the mole ratios are

MnO:SiO$_2$=1.157; Al$_2$O$_3$:TiO$_2$=2.09; CaO:MgO=1.408.

EXAMPLE 5

*Welding powder containing tungsten*

| | Percent |
|---|---|
| SiO$_2$ | 17.96 |
| Al$_2$O$_3$ | 16.07 |
| TiO$_2$ | 4.13 |
| MnO | 25.14 |
| CaO | 9.82 |
| MgO | 5.79 |
| K$_2$O | 3.44 |
| WO$_3$ | 3.20 |
| CaF$_2$ | 14.55 |

The basicity ratio=1.187; the mole ratios are

MnO:SiO$_2$=1.18; Al$_2$O$_3$:TiO$_2$=3.06; CaO:MgO=1.22.

EXAMPLE 6

*Welding powder containing zirconium*

| | Percent |
|---|---|
| SiO$_2$ | 15.05 |
| Al$_2$O$_3$ | 12.85 |
| TiO$_2$ | 3.80 |
| MnO | 22.66 |
| ZrO$_2$ | 12.30 |
| CaO | 9.66 |
| MgO | 4.48 |
| K$_2$O | 2.40 |
| CaF$_2$ | 16.80 |

The basicity ratio=1.242; the mole ratios are

MnO:SiO$_2$=1.277; Al$_2$O$_3$:TiO$_2$=2.65; CaO:MgO=1.55.

During the welding tests all powders tested in accordance with the underpowder-process and even welding, yielded uniform convex, smooth seams without any edge notches. None of these powders shows any tendency to crack or to form pores. The slag easily separates from the cooling seam.

Compared with those of normal weldings, the picture of polished sections shows an extraordinarily fine texture which is only slightly distinguishable from the working material.

The impact resistance figures show values of up to 14.3 m-kg./cm.$^2$. The Brinell hardness of the working material varies between 122–125, that of the welding transitions between 140–158 and that of the center of the weld between 165–172.

The invention claimed is:

1. A basic welding powder for welding unalloyed and alloyed steel, consisting essentially of MnO, SiO$_2$, Al$_2$O$_3$, TiO$_2$, CaO, and MgO, said components being compounded in such proportions that the ratio of basicity is 1:1–2:2 and the mole ratios are MnO:SiO$_2$=1–2.2, Al$_2$O$_3$:TiO$_2$=1.5, CaO:MgO=1.2–1.8.

2. A basic welding powder for welding unalloyed and alloyed steel, consisting essentially of MnO, SiO$_2$, Al$_2$O$_3$, TiO$_2$, CaO, and MgO, said components being compounded in such proportions that the ratio of basicity is 1:1–2:2 and the mole ratios are MnO:SiO$_2$=1.15–1.7, Al$_2$O$_3$:TiO$_2$=2.0–3.0, CaO:MgO=1.2–1.6.

3. Welding powders according to claim 1, consisting essentially of:

21.23–21.60 weight percent SiO$_2$
10.03–10.20 weight percent Al$_2$O$_3$
3.94–4.00 weight percent TiO$_2$
30.20–30.70 weight percent MnO
15.75–16.00 weight percent CaO
7.55–7.70 weight percent MgO
9.65–9.80 weight percent CaF$_2$
up to 1.65 weight percent NiO
balance incidental impurities.

4. Welding powders according to claim 1, consisting essentially of:

18.7 weight percent SiO$_2$
15.3 weight percent Al$_2$O$_3$
3.9 weight percent TiO$_2$
28.7 weight percent MnO
14.9 weight percent CaO
7.5 weight percent MgO
10.5–11.0 weight percent CaF$_2$
up to 0.5 weight percent V$_2$O$_5$
balance incidental impurities.

5. Welding powders according to claim 1, consisting essentially of:

14.17–14.83 weight percent SiO$_2$
22.05–23.16 weight percent Al$_2$O$_3$
7.53–7.89 weight percent TiO$_2$
20.75–21.77 weight percent MnO
12.85–13.47 weight percent CaO
6.92–7.25 weight percent MgO
10.01–10.43 weight percent CaF$_2$
1.13–1.20 weight percent K$_2$O
up to 4.59 weight percent Cr$_2$O$_3$
balance incidental impurities.

6. A welding powder according to claim 1, consisting essentially of:

14.20 weight percent SiO$_2$
23.10 weight percent Al$_2$O$_3$
8.65 weight percent TiO$_2$
19.40 weight percent MnO
9.10 weight percent CaO
4.85 weight percent MgO
2.20 weight percent K$_2$O
1.40 weight percent MnO$_3$
17.10 weight percent CaF$_2$
balance incidental impurities.

7. A welding powder according to claim 1, consisting essentially of:

17.96 weight percent SiO$_2$
16.07 weight percent Al$_2$O$_3$
4.13 weight percent TiO$_2$
25.04 weight percent MnO
9.82 weight percent CaO
5.79 weight percent MgO
3.44 weight percent K$_2$O
3.20 weight percent WO$_3$
14.55 weight percent CaF$_2$
balance incidental impurities.

8. A welding powder according to claim 1, consisting essentially of:

15.05 weight percent SiO$_2$
12.85 weight percent Al$_2$O$_3$
3.80 weight percent TiO$_2$
22.66 weight percent MnO
12.30 weight percent ZrO$_2$ 9.66 weight percent CaO
4.48 weight percent MgO
2.40 weight percent K$_2$O
16.80 weight percent CaF$_2$
balance incidental impurities.

References Cited by the Examiner

UNITED STATES PATENTS

| | | | |
|---|---|---|---|
| 2,043,960 | 6/36 | Jones et al. | 148—26 |
| 2,751,478 | 6/56 | Jackson et al. | 148—26 X |
| 3,023,133 | 2/62 | Lewis et al. | 148—26 |

DAVID L. RECK, *Primary Examiner.*

UNITED STATES PATENT OFFICE
CERTIFICATE OF CORRECTION

Patent No. 3,211,591 October 12, 1965

Gustav Miltschitzky et al.

It is hereby certified that error appears in the above numbered patent requiring correction and that the said Letters Patent should read as corrected below.

Column 3, line 74, for "1.5," read -- 1.5-3.5, --.

Signed and sealed this 10th day of May 1966.

(SEAL)
Attest:

ERNEST W. SWIDER
Attesting Officer

EDWARD J. BRENNER
Commissioner of Patents